United States Patent [19]

Motoki et al.

[11] Patent Number: 4,680,048

[45] Date of Patent: Jul. 14, 1987

[54] METHOD OF PREPARING DOPED SILICA GLASS

[75] Inventors: Masanobu Motoki; Nobutaka Matsuo; Sadao Kanbe; Haruo Osafune; Yoshitaka Itoh, all of Nagano, Japan

[73] Assignee: Seiko Epson Kabushiki Kaisha, Tokyo, Japan

[21] Appl. No.: 782,334

[22] Filed: Oct. 1, 1985

[30] Foreign Application Priority Data

Oct. 5, 1984 [JP] Japan ................... 59-209361

[51] Int. Cl.$^4$ ........................................... C03B 37/016
[52] U.S. Cl. ........................................ 65/17; 65/3.11; 65/18.1; 350/96.34; 501/12
[58] Field of Search ............... 501/12; 65/17, 2, 3.11, 65/3.12, 18.1, 18.2; 350/96.34

[56] References Cited

U.S. PATENT DOCUMENTS

| | | | |
|---|---|---|---|
| 4,173,459 | 11/1979 | Aulich et al. | 65/13 X |
| 4,324,576 | 4/1982 | Matsuyama et al. | 65/26 |
| 4,417,910 | 11/1983 | Passaret | 65/3.12 |
| 4,419,115 | 12/1983 | Johnson et al. | 65/3.12 |
| 4,574,063 | 3/1986 | Scherer | 65/18.1 X |

FOREIGN PATENT DOCUMENTS 2023571 1/1980 United Kingdom ............... 65/3.11

*Primary Examiner*—Robert Lindsay
*Attorney, Agent, or Firm*—Blum Kaplan

[57] ABSTRACT

A sol-gel method of preparing doped glass articles is provided. The glass is formed by preparing a sol solution containing hydrolyzed silicon alkoxide and ultrafine particle silica. The sol solution can also include a dopant. The sol solution is gelled in a container, dried and sintered to yield the doped silica glass articles.

45 Claims, No Drawings

METHOD OF PREPARING DOPED SILICA GLASS

BACKGROUND OF THE INVENTION

This invention relates to doped silica glass and, in particular, to a sol-gel method of preparing doped silica glass articles.

Sol-gel methods for preparing doped silica glass have many advantages. Such advantages include:
1. Low energy requirement;
2. Easy formation of a glass from components which cannot be used to form a uniform glass by conventional methods;
3. Production of a glass of high purity; and,
4. Production of a glass in which various components are uniformly incorporated.

One of the sol-gel methods that has been introduced is a method of producing a titanium dioxide-silicon dioxide ($TiO_2$-$SiO_2$) glass that was developed by Kamiya and his colleagues. The titantium dioxide-silicon dioxide glass has a smaller thermal coefficient of expansion than a conventional silica glass and is used in astronomical telescopes. The glass is disclosed in Japan Chemics Conference Bulletin No. 10, 1571, 1981.

One of the disadvantages of the Kamiya et al. process is that it takes more than four months to complete. Furthermore, titanium dioxide-silicon dioxide glass of acceptably large size has not been obtained.

In another method, introduced by Sato and his colleagues, a silica gel including a dopant was prepared. Germanium (Ge), titanium (Ti), zirconium (Zr), tantalum (Ta), niobium (Nb), and antimony (Sb) were used as additives. The resulting glass can serve as a parent material of glass useful for optical purposes and for various other uses. This method is disclosed in Japanese Laid Open Publication No. 57/191221. The size of the dry gel obtained was about 4 mm in diameter and 50 mm in length. Accordingly, the Sato process does not result in doped silica glass of practical size. Silica glass of a practical size must have a gel size of at least 6 square inches or a diameter of 20 mm and a length of 500 mm.

There have also been reports about the use of sol-gel methods for preparing cylindrical doped silica glass. One such sol-gel method is disclosed in Japanese Laid Open Publication No. 56/104732. However, this is not fully satisfactory. The conventional sol-gel method for preparing cylindrical doped silica glass is disadvantageous in that large articles of high purity without fractures are different to obtain.

Accordingly, it is desirable to provide a method for preparing doped silica glass articles of larger dimension and of higher quality than those which can be provided using prior art methods and which overcome the disadvantages inherent in the prior art methods.

SUMMARY OF THE INVENTION

In accordance with the invention, a doped silica glass article is provided from a sol solution of a hydrolyzed solution of silicon alkoxide containing ultra-fine particles of silica and a dopant. In a preferred embodiment, the dopant has the general formula $M(OR)_4$, wherein M is a metal, R is an alkyl group and x is an integer representing the valence of the metal ion. The sol solution is placed into a container and gelled to provide a wet gel which is dried to yield a dry gel and sintered to obtain the doped silica glass article.

The dopant is added to the hydrolyzed solution, the sol solution, the wet gel, or the dry gel or during sintering. The dopant can include, lithium (Li), sodium (Na), potassium (K), cesium (Cs), boron (B), aluminum (Al), gallium (Ga), germanium (Ge), nitrogen (N), phosphorus (P), fluorine (F), zirconium (Zr), titanium (Ti), tantalum (Ta), thallium (Tl), lead (Pb), and silver (Ag) and can be used in the form of a metal alkoxide. The dopant is selected to vary the refractive index of the doped silica glass.

Accordingly, it is an object of the present invention to provide an improved sol-gel method of making doped silica glass.

Another object of the present invention is to provide a sol-gel method of making doped silica glass articles of large size without fractures.

A further object of the invention is to provide a method for making large doped silica glass of high purity and good yield.

Still another object of the present invention to provide a method of making doped silica glass wherein the selection of a dopant is not restricted.

Still a further object of the invention is to provide improved doped silica glass articles.

Yet another object of the invention is to provide doped silica glass articles having sufficiently large size so as to be suitable for industrial use.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

DETAILED DESCRIPTION OF THE PREFERRED EMBODIMENTS

The present invention includes preparing a doped silica glass article by preparing a sol solution containing ultra-fine particles of silica from a hydrolyzed solution of silicon alkoxide, placing the sol solution into a container, gelling the sol solution to yield a wet gel, drying the wet gel to obtain a dry gel, and sintering the dry gel to obtain silica glass. A dopant is included by adding the dopant to the hydrolyzed solution of silicon alkoxide, ultra fine particle, the sol solution, the wet gel, the dry gel or during sintering. In a preferred embodiment, the dopant has the general formula $M(OR)_4$, wherein M is a metal, R is an alkyl group and x is the valence of the metal.

In the first step of this method, a silicon alkoxide is hydrolyzed with an acid catalyst. The silicon alkoxide has the general formula $Si(OR)_4$ and can include, but is not limited to, silicon methoxide, silicon ethoxide, silicon propoxide, and the like. In a preferred embodiment, silicon ethoxide is used. Alternatively, these materials can be referred to as alkyl silicates, such as methyl silicate, ethyl silicate, propyl silicate and the like, with ethyl silicate being the preferred species.

The hydrolysis is carried out by the addition of water, hydrochloric acid and/or a solvent, as necessary, to the silicon alkoxide. The hydrolyzing solution should be extremely acidic. Specifically, sufficient water and hydrochloric acid should be used so that the pH of the solution is between about 1 and about 2.

If it is difficult to dissolve silicon alkoxide in the water/hydrochloric acid, a suitable solvent can be used. Suitable solvents can include, but are not limited to, alcohols such as methanol, ethanol, propanol, and the like. The amount of solvent is not restricted, but in most cases use of a minimum amount is preferred.

It is often desirable to add dopant with the silicon alkoxide when the acid hydrolyzed solution is prepared or to the acid hydrolyzed solution after it is prepared. The dopant is used in an amount of 0% or more with respect to the amount of silicon alkoxide. The purpose of the dopant is to adjust the refractive index of the resultant glass.

The dopant can be used in the form of a metal alkoxide, a fine particle metal oxide or a fine particle pure metal. The metal can be selected from the group consisting of lithium, sodium, potassium, cesium, boron, aluminum, gallium, germanium, nitrogen, phosphorus, fluorine, zirconium, titanium, tantalum, telurium, lead and silver.

When the dopant is used in the form of a metal alkoxide, the alkyl group can be selected from alkyl groups having from 1 to 20 carbon atoms, such as a metal methoxide, metal methoxide, metal ethoxide, metal propoxide, and the like. In a preferred embodiment, a metal ethoxide is used. In an even more preferred embodiment, the metal ethoxide is germanium tetraethoxide. A germanium alkoxide, and more specifically, germanium tetraethoxide, increases the refractive index of the resultant glass and is especially suitable for preparing cylindrical silica glass articles for use as optical fibers.

When a metal alkoxide is added with the silicon alkoxide at the time that the acid hydrolyzed solution is prepared, the hydrolysis is carried out by adding water. The water is added at a molar ratio of more than about one and less than about three with respect to the silicon alkoxide. If the molar ratio of water to silicon alkoxide is more than three, the excess water reacts directly with the metal alkoxide. This reaction prevents the dry gel from becoming transparent in the sintering step and makes the distribution of refractive indices non-uniform. Furthermore, when the hydrolysis is carried out without an alcoholic solvent, the reaction solution should be maintained at a temperature lower than 20° C. in order to prevent gelation during the hydrolysis and lowering of the yield.

Ultra-fine particle silica is added to the acid hydrolyzed solution of silicon alkoxide. The ultra-fine particle silica is added in order to enhance the yield of doped silica glass. The ultra-fine particle silica reduces the occurrence of fracturing when the wet gel is dried to a dry gel. Furthermore, the ultra-fine particle silica causes the dry gel to have a porous structure. As a result, the dry gel is unlikely to crack during the sintering step.

The ultra-fine particle silica is obtained by hydrolyzing silicon alkoxide with a base catalyst. The silicon alkoxide can include, but is not limited to, silicon methoxide, silicon ethoxide, silicon propoxide, and the like. In an especially preferred embodiment, silicon ethoxide is used.

The base can include, but is not limited to, ammonia water or ammonia gas and water. The solution obtained by hydrolyzing silicon alkoxide with a base catalyst is referred to as "ammosil". Because ammonia is used to synthesize ammosil, the pH of the ammosil is high. However, since the ammosil is to be added directly to the acid hydrolyzed solution, such a high pH is not desirable. Therefore, the pH of the ammosil should be adjusted to less than 7.0 before adding the ammosil to the acid hydrolyzed solution. If the ammosil were added to the acid hydrolyzed solution without adjusting the pH, the sol solution obtained would be gelled abruptly.

The pure silica in the ammosil should be present in an amount greater than about 20% based on the amount of silica in the acid hydrolyzed solution of silicon alkoxide. If the quantity of pure silica in the ammosil is less than about 20% based on the amount of the silica in the acid hydrolyzed solution, problems are likely to arise during subsequent processing steps. Such problems can include foams remaining in the dry gel during sintering that cause fracture of the glass articles.

The mean particle diameter of the ammosil can be adjusted by controlling the amount of ammonia or alcohol used. Suitable mean particle diameters fall within the range of from about 0.01 to 1.0 um. If the mean particle diameter of the silica particles in the ammosil is too small, foaming occurs in the dry gel during sintering; if the mean particle diameter is too large, the wet gel is likely to fracture in the drying step. As the mean particle diameter increases, it becomes more difficult to disperse the silica particles. Depending upon conditions, it may be necessary to apply ultrasonic vibration to the ammosil in order to uniformly disperse the silica particles and to remove masses from the ammosil using centrifugal separation.

The sol solution is prepared by mixing the acid hydrolyzed solution of silicon ethoxide with the ammosil. After preparation, it is desirable to adjust the pH of the sol solution to a predetermined value. Suitable pH values depend upon the particular dopant added. When no dopant is used, suitable pH values are between about 3 and 6.

The pH of the sol solution can be raised, for example, by addition of a base. The base can be selected from the group consisting of, but not limited to, ammonia water, ammonia gas, an aqueous solution of ammonia, or an organic base such as triethylamine, an aqueous solution of triethylamine, pyridine, an aqueous solution of pyridine, aniline, an aqueous solution of aniline and the like. Bases including metal ions such as sodium hydroxide, potassium hydroxide, and the like are generally not desirable because the metal ions remain in the final product and are crystallized.

When preparation of the sol solution is complete, the solution is placed into a container. In a preferred embodiment, the container is cylindrical. The container, or at least the interior of the container, is preferably made of a hydrophobic material. Such materials include, but are not limited to, organic polymers such as polypropylene, polyethylene fluoride, polyvinyl chloride, polyethylene, polystyrene, and the like. Containers formed by depositing a hydrophobic material on the interior surface of a container made of an inorganic material such as glass are also contemplated.

In gelling the sol solution, it has been found that the strength of the dry gels is dependent on the pH and temperature of the sol solution. For example, when no dopant is used, it is optimum to adjust the pH to between about 3 and 6 and temperature to between about 0° and 50° C.

Alternatively, it is possible to consolidate these two operational variables by controlling the gelling time. It has been experimentally determined that suitable gelling times were between about 3 and 100 minutes.

When the above-described procedure has been completed, a wet gel will be present inside the container. The next step in the method of the invention is to dry the wet gel to a dry gel. This step has a significant influence on the final yield of the product.

The container should have a cover with openings to permit evaporation of solvent during the drying step. The total area of the openings should be less than about 15% of the total area of the cover.

In order to obtain a cover with openings, it is acceptable to change the cover of the container in which the sol solution has been gelled. Alternatively, and more preferably, it is desirable to move the wet gel to a second container. The second container should have a larger capacity than the container in which the sol solution was gelled and saddle-like spacers should be provided in order to minimize the contact area between the wet gel and the container.

The gel is dried by heating it to between about 0° and 120° C. at a heating rate of less than about 120° C. per hour.

The dry gel is sintered by a process including the following five steps:
1. Removing absorbed water;
2. Removing carbon;
3. Removing hydroxide (OH) groups;
4. Removing chloride (Cl) or fluoride (F); and,
5. Making the dry gel into transparent glass.

Step 1, removing absorbed water, has a great influence on the yield of final product. A great deal of physically absorbed water exists in the dry gel and this water can be eliminated by heat treatment of the dry gel at a temperature up to about 400° C. If an attempt is made to heat the gel too quickly in order to remove the absorbed water, the gel frequently tends to crack, thereby reducing the yield. On the other hand, if the heating rate is slow, the yield is improved but manufacturing costs increase due to the length of time involved. It has been found that the dry gel should be heated at a rate of no more than about 400° C. per hour in order to optimize yield and manufacturing costs. The dry gel should be maintained at a temperature between about 20° C. (room temperature) and about 400° C. for a period of at least one hour. This step is carried out at least once.

In Step 2 of the sintering process carbons are eliminated using a second heat treatment. The final temperature of this heat treatment should be in the range of from about 400° to 1200° C. In this step, hydrochloride is decomposed and dehydrating concentration is accelerated. Furthermore, hydroxide groups are removing even before the chloride treatment. As in Step 1, the heating rate has an influence on the yield, though not as great an influence as the heating rate of Step 1. Experimental observation has shown that the most suitable heating rate is between about 30° and 400° C. per hour. The gel should be maintained at the selected temperature for at least one hour and the step should be carried out at least once.

In Step 3, hydroxide (OH) groups are removed. When the doped silica glass is to be used for optical fiber, the content of the hydroxide group must be less than 1 ppm. This is due to the fact that the hydroxide group will cause light having a wavelength of 1.39 um to be absorbed by the doped glass article. As a result, the doped glass article will have poor quality as an optical fiber.

The hydroxide group is removed by heating the dry gel to a temperature of between about 700° and 1200° C. and maintaining the selected temperature for at least 20 minutes. A carrier gas, which does not include impurities such as water, and a hydroxide group removing agent provide the atmosphere in the sintering oven. The removing agent is used in a flow amount ratio of between about 1% and 40% with respect to the carrier gas. The hydroxide group removing step is performed at least once.

The hydroxide group removing agent is preferably a reagent which reacts with silicon hydroxide (SiOH) to form silicon chloride (SiCl) or silicon flouride (SiF). Based on cost and ease of handling, chlorine gas ($Cl_2$), chlorine sulfoxide (SOCl), sulfur hexafluoride ($SF_6$), carbon tetrafluoride ($CF_4$), ethane hexafluoride ($C_2F_6$), and propane octafluoride ($C_3F_8$) are used. The carrier gas is preferably selected from the group consisting of helium (He), neon (Ne), argon (Ar) and nitrogen ($N_2$).

In Step 4, chloride or fluoride, which has been introduced in the previous step, is removed. Chloride or fluoride can cause foaming and is removed by flowing a carrier gas such as helium (He), neon (Ne), argon (Ar), or nitrogen ($N_2$) and oxygen ($O_2$) in a flowing amount ratio of between about 1% and 100% with respect to the carrier gas into the sintering oven. The temperature should be in the range of from about 1000° to 1500° C. This step should be carried out at least once. Furthermore, it is generally also desirable to make the dry gel non-porous and this can be accomplished by at least one step of keeping the temperature in the specified range and flowing helium only into the sintering oven.

In Step 5, the dry gel is made into a transparent silica glass article. This is accomplished by heating the dry gel to a temperature of between about 1000° and 1600° C. The selected temperature is maintained for a predetermined period of time. When Step 5 is completed, a high-quality silica glass article is obtained. Since very little or no foaming occurs in the silica glass, the optical properties are excellent.

It has been found that the volume of the silica glass article should be between 5% and 15% of the volume of the wet gel. If the volume ratio of the wet gel to the glass article is too large, a long time is required for drying and the gel is likely to fracture when it is sintered; if the volume ratio is too small, the gel fractures readily when it is dried to a dry gel.

For a better understanding of the method of the present invention, reference is made to the following examples. These examples are presented for purposes of illustration only and are not intended to be construed in a limiting sense.

EXAMPLE 1

Eighty ml of 0.02 normal hydrochloric acid was added to 624 g of refined commercially available silicon ethoxide in order to partially hydrolyze the silicon ethoxide. The temperature of the solution was maintained at 5° C. in order to prevent abrupt gelation of the hydrolyzed solution. While the temperature was being maintained at 5° C., 57 g of germanium tetraethoxide was added to the acid hydrolyzed silicon ethoxide solution. After violent stirring, 152 ml of water was added in order to complete the hydrolysis.

In a separate reaction vessel, a solution of 180 ml of 28% ammonia water, 1.8 l of ethanal and 325 ml of water was added to a solution of 1 l of silicon ethoxide and 1.7 l of ethanol. The solution was stirred at room temperature and then maintained still overnight. The solution was concentrated to a volume of 720 ml. This is the ammosil solution containing ultra fine particle silica having a mean particle diameter of 0.17 um. The pH of the ammosil solution was adjusted to 5.0 by the addition of 2 normal hydrochloric acid. The pH adjustment prevented abrupt gelation of the sol when the ammosil solution was added to the acid hydrolyzed silicon ethoxide solution.

The acid hydrolyzed silicon ethoxide solution and the ammosil solution were mixed to yield a sol in which the ratio of the silica in the acid hydrolyzed solution and in the ammosil solution was about 4 to 6. The pH of the resulting sol was adjusted to 3.5 by addition of 0.2 normal ammonia water and the volume was adjusted to 1700 ml by addition of water.

A sufficient quantity of the sol was placed into a cylindrical container of polyethylene (6.0 cm inner diameter and 75.0 cm length) until about 80% of the capacity of the container was filled (i.e., to a height of 60 cm) and the container was sealed. The sol was gelled in 25 minutes at room temperature of 30° C. After maintaining the gel in the container overnight, the cover of the container was exchanged with a second cover having openings amounting to 1.0% of the surface area of the cover. The gel was heated from 30° to 60° C. at a heating rate of 20° per hour and dried. A dry gel (4 cm outer diameter and 41 cm length) that did not fracture even at room temperature was obtained.

Four of 20 dry gels formed in this manner fractured and 16 perfect dry gels were obtained. Yield of dry gels: 80%.

The 16 dry gels were placed in a sintering oven and heated to 200° C. at a heating rate of 30° per hour and maintained at 200° C. for 1 hour in order to remove absorbed water. The gels were heated further to 450° C. at a heating rate of 30° C. per hour, maintained at 450° C. for 5 hours, and then heated to 950° C. at a rate of 30° per hour and maintained at 950° C. for 1 hour in order to remove carbon.

The gels were cooled to 770° C. at a rate of 5° C. per minute while a mixture of He and $Cl_2$ flowed through the sintering oven at a flow ratio of 5 to 1 or a period of 2 hours. The gels were then heated to 900° C. at a rate of 5° C. per minute and maintained at 900° C. for 1 hour in order to remove hydroxide groups. The temperature was raised to 1000° C. at a heating rate of 1° per minute while a mixture of He and $O_2$ flowed through the oven at a flow ratio of 3 to 1 for a period of 1 hour in order to remove chloride. The gels were heated to 1200° C. at a rate of 1° C. per minute while He flowed through the oven in order to make the gels non-porous and the gel was maintained at 1200° for 1.5 hours in order to make the gels transparent and yield cylindrical doped silica glass articles of high purity (3 cm diameter and 30 cm length). The degree of shrinkage from the wet gel to the resulting glass was 10.5% and the germanium content of the glass articles was 3 mol% with respect to the amount of silica.

None of the dry gels fractured during the sintering process. Accordingly, the overall yield was 80%. Sixteen complete cylindrical doped silica glass articles of high purity were obtained

EXAMPLE 2

Fifty-four ml of 0.01 normal hydrochloric acid and 105.2 g of ethanol were added to 624 g of refined commercially available silicon ethoxide and the solution was stirred violently in order to partially hydrolyze the silicon ethoxide. Ninety-three g of germanium tetraisopropoxide was added and the solution was stirred violently. Then 184 ml of water was added to complete the hydrolysis.

In a separate vessel, a solution of 120 ml of 28% ammonia water, 1.5 l of ethanol and 216 ml of water was added to a solution of 444 ml of silicon methoxide and 1 l of ethanol, with stirring. The solution was maintained for 1 day and was then concentrated under reduced pressure to a predetermined concentration in order to yield the ammosil solution. The pH of the ammosil solution was adjusted to 3.0.

The acid hydrolyzed silicon ethoxide solution and the ammosil solution were mixed and stirred to yield a sol solution. Impurities were removed using centrifugal separation. The pH of the sol solution was adjusted to 3.2 by bubbling ammonia gas through the solution. The sol solution was placed in a cylindrical container of polyvinyl chloride (4.0 cm inner diameter and 140.0 cm length) to the height of 130 cm (93% of the capacity of the container). At 25° C. (room temperature), the sol was gelled in 20 minutes. The gel was maintained for 2 days and then placed onto 100 cylindrical spacers (1 cm outer diameter and 60 cm length) of polyethylene fluoride which were provided in a polypropylene drying container having a cover with openings amounting to 0.5% of the surface area of the cover. The gels in the drying container were heated from 25° C. to 60° C. at a heating rate of 5° C. per hour and maintained at 60° C. for 8 days in order to yield dry gels.

Five of 20 dry gels formed in this manner fractured and 15 complete dry gels were obtained. Yield of dry gels: 75%.

The 15 dry gels were placed in a sintering oven and heated to 300° C. at a heating rate of 60° C. per hour. They were maintained at 300° C. for 5 hours in order to remove absorbed water. Then the gels were heated to 950° C. at a heating rate of 180° C. per hour and maintained at 950° C. for 18 hours in order to remove carbon. The gels were cooled to 770° C. and, while a mixture of He and $SOCl_2$ flowed through the sintering oven at a flowing ratio of 5 to 2, were maintained for 2 hours in order to remove hydroxide groups. The gels were heated to 1220° C. at a heating rate of 1° C. per minute while He only flowed through the oven and the gels were maintained at 1220° C. for 1.5 hours in order to yield transparent silica glass articles (2 cm outer diameter and 60 cm length).

During the sintering process, 3 of 15 dry gels fractured and 12 complete doped silica glass articles were obtained. Yield of doped silica glass articles: 80%.

In this Example doped silica glass articles of high purity, which included germanium in an amount of 5 mol% with respect to the amount of silica, were obtained. Overall yield of silica glass articles: 60%.

EXAMPLE 3

(for comparison)

Thirty-two ml of 0.01 normal hydrochloric acid was added to 1248 g of refined commercially available silicon ethoxide and the solution was stirred violently in order to hydrolyze the silicon ethoxide.

In a separate vessel, a solution of 540 ml of 28% ammonia water, 5.25 l of ethanol and 1 l of water was added to a solution of 3 l of silicon ethoxide in 5.25 l of ethanol and the resulting solution was maintained overnight with stirring. The solution was concentrated under reduced pressure to a predetermined concentration an the pH was adjusted to 6.0 in order to yield the ammosil solution.

The acid hydrolyzed silicon ethoxide solution and the ammosil solution were mixed together to yield a sol solution and ultrasonic vibration was applied in order to uniformly disperse the silica particles. The pH of the sol solution was adjusted to 6.0 by the addition of 0.1 normal ammonia.

The sol was placed into a cylindrical container of polyethylene (4.0 cm inner diameter and 180 cm length) to a height of 150 cm and the container was sealed. The sol was gelled in 15 minutes at 40° C. After maintaining the gel overnight, the cover of the container was exchange for a cover having openings amounting to 0.5% of its surface area and the gel was heated to 80° C. at a heating rate of 100° C. per hour. The gel was maintained at 80° C. for 7 days and a dry gel (2.80 cm outer diameter and 11 cm length) that did not fracture at room temperature was obtained.

One of 12 dry gels formed under these conditions fractured and 11 complete dry gels were obtained. Yield of dry gels: 92%.

The 11 dry gels were heated to 150° C. at a heating rate of 60° C. per hour, maintained at 150° C. for 1 hour, heated to 400° C. at a heating rate of 70° C. per hour and maintained at 400° C. for 1 hour in order to remove absorbed water.

The gels were heated to 950° C. at a heating rate of 90° C. per hour and maintained at 950° C. for 5 hours in order to remove carbon. Then a mixture of Ne and $SF_6$ was flowed through the oven at a flowing ratio of 40% with respect to Ne in the oven for 1.5 hour in order to remove hydroxide groups. The gel were heated further to 1000° C. at a heating rate of 5° per minute while a mixture of Ne and $O_2$ flowed through the oven at a flowing ratio of 100% with respect to the Ne for a period of 2 hours in order to remove fluoride. Then the gels were made non-porous by flowing Ne gas only into the oven for 2 hours.

The gels were heated to 1200° C. at a heating rate of 6° C. per minute and maintained at 1200° C. for 3.5 hours in order to yield transparent glass articles.

During the sintering process none of the dry gels fractured and 11 complete silica glass articles (2 cm outer diameter and 83 cm length) were obtained. Yield of silica glass articles from dry gels: 100%.

EXAMPLE 4

One hundred eight ml of 0.01 normal hydrochloric acid and 2104 g of ethanol were added to 1248 g of refined commercially available silicon ethoxide and the solution was stirred violently in order to partially hydrolyze the silicon ethoxide. Then 114 g of germanium tetraethoxide was added and violent stirring was continued. Three hundred sixty-eight ml of water was added to the solution in order to completely hydrolyze the silicon ethoxide.

In a separate vessel, a solution of 460 ml of 28% ammonia water, 3.5 l of ethanol and 650 ml of water was added to a solution of 2 l of silicon ethoxide and 3.5 l of ethanol and the resulting solution was stirred at room temperature and maintained overnight. The solution was condensed to a predetermined concentration and the pH was adjusted to 5.0. Then the solution and the acid hydrolyzed silicon ethoxide solution were mixed together to yield a sol solution and the pH of the sol solution was adjusted. The sol solution was placed into a cylindrical container of polyvinyl chloride having dimensions of 4 cm inner diameter and 220 cm length. A wet gel of 4 cm outer diameter and 200 cm length was obtained.

The wet gel was placed into a second container having openings amounting to 0.2% of the surface area of the container and dried. Then the gel was heated to 60° C. at a heating rate of 100° C. per hour and maintained at 60° C. for 7 days. A dry gel that did not fracture even at room temperature was obtained.

Nine of 20 dry gels formed under these conditions fractured and 11 complete dry gels were obtained. Yield of dry gels: 55%.

The dry gels were heated at 150° C. at a heating rate of 60° C. per hour, maintained at 150° C. for 1 hour, heated to 400° C. at a heating rate of 60° C. per hour and maintained at 400° C. for 1 hour in order to remove absorbed water and hydroxide groups.

The gels were heated further to 900° C. at a rate of 90° C. per hour and maintained at 900° C. for 5 hours in order to remove carbon. Then a mixture of He and $Cl_2$ flowed through the oven at a flowing ratio of 40% with respect to He gas and the gels were maintained in the oven for 1.5 hour in order to remove hydroxide groups. Then the gels were heated to 1000° C. at a heating rate of 5° C. per minute and maintained at 1000° C. for 3 hours while a mixture of He and $O_2$ flowed through the oven at a flow ratio of 55% with respect to the He gas in order to remove chloride and to make the gels nonporous. Thereafter, the gels were heated to 1150° C. at a heating rate of 10° C. per minute and maintained at 1150° C. for 5 hours in order to make the gels transparent. Doped silica glass articles of 2 cm outer diameter and 1 m length were obtained.

During the sintering process, 2 dry gels fractured and 9 complete doped silica glass articles were obtained. Yield of doped silica glass articles from dry gels: 45%.

EXAMPLE 5

(for comparison)

Four hundred thirty-two ml of 0.02 normal hydrochloric acid was added to 1248 g of refined commercially available silicon ethoxide and the solution was stirred violently at room temperature.

In a separate vessel, a solution of 360 ml of 28% ammonia water, 3.5 l of ethanol and 650 ml of water was added to a solution of 2 l of silicon ethoxide and 3.5 l of ethanol. The resulting solution was stirred at room temperature. After being maintained overnight, the solution was concentrated to a predetermined concentration and the pH was adjusted to 5.0.

The acid hydrolyzed silicon ethoxide solution and the base hydrolyzed silicon ethoxide solution were mixed together to yield a sol solution. The sol solution was placed in a container of polyvinyl chloride having dimensions of 5.0 cm inner diameter and 200 cm length. The sol solution was gelled to a wet gel having dimensions of 5 cm inner diameter and 170 cm length. The wet gel was placed into a second drying container of polypropylene having openings amounting to 0.45% of the surface area of the container and the same drying and sintering steps as in Example 1 were followed. A pure silica glass article having dimensions of 3 cm outer diameter and 940 cm length was obtained.

Three of 20 dry gels formed under these conditions fractured before sintering and 17 complete silica glass articles of high purity were obtained. Yield of silica glass articles from dry gels: 85%.

EXAMPLE 6

One hundred sixty-two ml of 0.03 normal hydrochloric acid was added to 913 g of refined commercially available silicon methoxide and the solution was stirred violently at 0° C. Then 49 g of germanium tetra methoxide was added with violent stirring. Two hundred eighty-eight ml of water was added to complete the hydrolysis.

A solution of 110 ml of 28% ammonia water, 1.2 l of ethanol and 288 ml of water was added to a solution of 592 ml of silicon methoxide and 1.2 of methanol and the resulting solution was concentrated to a predetermined concentration. The pH was adjusted to 5.0 to yield the ammosil solution.

The acid hydrolyzed silicon methoxide solution and the ammosil were mixed as described in Example 1. The resulting sol solution was placed in a container of polyethylene. A wet gel of 4 cm outer diameter and 180 cm length was obtained. The cover of the container was replaced with a cover having openings amounting to 0.9% of the surface area of the cover and the wet gel was dried. The dry gel was sintered as described in Example 1. A silica article was obtained.

Two of 20 glass articles fractured and 18 complete doped silica glasses containing 3 mol% germanium with respect to the effective amount of silica were obtained. Yield of silica glass articles: 90%.

EXAMPLE 7

Three hundred twenty-four ml of 0.01 normal hydrochloric acid was added to 1248 g of refined commercially available silicon ethoxide and the solution was stirred. Then 114 g of germanium tetraethoxide was added with stirring and, finally, 108 ml of water was added to complete the hydrolysis.

In a separate vessel, a solution of 180 ml of 28% ammonia water, 1.8 l of ethanol and 325 ml of water was added to a solution of 1 l of germanium tetraethoxide and 1.7 l of ethanol, with stirring. The solution was condensed to a predetermined concentration and the pH was adjusted. The acid hydrolyzed silicon ethoxide solution was added to obtain a sol solution. The sol solution was gelled in a polypropylene container having dimensions of 6 cm inner diameter and 100 cm length to a wet gel having dimensions of 6 cm outer diameter and 75 cm length. The wet gel was sintered under the same conditions as those described in Example 1 and transparent silica glass articles were obtained.

Two of 20 glass articles formed as described fractured and 18 complete doped silia glass articles were obtained. Yield of complete doped silica glass articles: 90%.

The distribution of germanium in the core of the doped silica glass articles was non-uniform and the quality of the glass was poor.

EXAMPLE 8

(for comparison)

One hundred eight ml of 0.01 normal hydrochloric acid was added to 1248 g of refined commercially available silicon ethoxide and the solution was stirred at room temperature without adjusting the solution temperature. Then 57 g of germanium tetraethoxide was added and the solution was stirred thoroughly. Three hundred twenty-four ml of water was added to the solution with stirring. The solution gelled during the stirring.

EXAMPLE 9

Eighty ml of 0.02 normal hydrochloric acid was added to 624 g of refined silicon ethoxide and the solution was stirred violently while the solution temperature was maintained at 5° C. in order to partially hydrolyze the silicon ethoxide. Then 57 g of germanium tetraethoxide was added with violent stirring and 152 ml of water was added to complete the hydrolysis.

In a separate vessel, a solution of 120 ml of 28% ammonia water, 1.8 l of ethanol and 325 ml of water was added to a solution of 1 l of silicon ethoxide and 1.7 l of ethanol and the solution was stirred at room temperature. After being maintained overnight, the solution was concentrated to a predetermined concentration. The acid hydrolyzed silicon ethoxide solution and the ammosil solution were mixed to form a sol and the sol was gelled, dried and sintered as shown in Example 1. Transparent silica glass articles were formed. Ten of 20 glass articles fractured and 10 complete doped silica glass articles were obtained. Yield of silica glass articles: 50%.

EXAMPLE 10

Eighty ml of 0.02 normal hydrochloric acid was added to 624 g of refined commercially available silicon ethoxide and the solution was stirred violently while keeping the solution temperature at 5° C. in order to partially hydrolyze the silicon ethoxide. Fifty-seven g (57 g) of germanium ethoxide was added to complete the substitutional reaction. Finally, 152 ml of water was added to complete the hydrolysis.

In a separate vessel, a solution of 180 ml of 28% ammonia water, 1.8 l of ethanol and 325 ml of water was added to a solution of 1 l of silicon ethoxide and 1.7 l of ethanol and the resulting solution was stirred at room temperature. After being maintained overnight, the solution was concentrated under reduced pressure to a predetermined concentration. The pH was adjusted to 5.0 to yield the ammosil solution.

The acid hydrolyzed silicon ethoxide solution and the ammosil solution were mixed to yield the sol solution. The masses were removed by centrifugal separation. Then by following the same drying and sintering processes as described in Example 1, doped silica glass articles of high quality were obtained.

Two of 20 doped silica glass articles formed under these conditions fractured and 18 complete cylindrical silica glasses were obtained. Yield of silica glass articles: 90%.

EXAMPLE 11

3 mol% Ge doped silica glass articles

Eighty-three and six-tenths g of 0.02 normal hydrochloric acid was added to 597.6 g of refined silicon ethoxide in order to partially hydrolyze the silicon ethoxide. The temperature of the solution was maintained at 5° C. in order to prevent abrupt gelation of the hydrolyzed solution. While the temperature was being maintained at 5° C., 51.9 g of germanium tetraethoxide was added to the solution and the solution was stirred violently. One-hundred thirty-nine and two-tenths g of 0.02 normal hydrochloric acid was added to the solution in order to complete the hydrolysis. Two hundred twenty two and four-tenths grams of water was added to the solution in order to lower the viscosity. The resulting solution was referred to as the acid hydrolyzed solution.

A solution of 51 ml of 29% ammonia water, 839 ml of ethanol and 271.7 g of water was added to a solution of 785.3 g of silicon ethoxide and 839 ml of ethanol and the solution was stirred at 20° C. to yield fine particle silica. After maintaining the solution overnight, the solution was concentrated under reduced pressure. Then, in order to enhance the yield in the drying step, the alcohol in the concentrated solution was substituted with water. The pH of the solution was adjusted to 4.5 by addition of 2 normal hydrochloric acid. This adjustment prevented abrupt gelation of the sol solution when the silica dispersed solution was mixed with the acid hydrolyzed solution. The solution included fine particle silica having a mean particle diameter of 0.18 um and was referred to as the silica dispersed solution.

The silica dispersed solution and the acid hydrolyzed solution were mixed to yield a sol solution and the pH of the sol solution was adjusted to 4.20 by the addition of 0.2 normal ammonia water and water. The volume of the sol solution was adjusted to 1872 ml. The sol solution was placed in a cylindrical container of Teflon (50 mm inner diameter and 1000 mm length) to a height of 900 mm and was gelled in 20 minutes at room temperature of about 20° C.

Ten wet gels formed in this manner were aged for 3 days and then were placed into a drying container having openings amounting to 0.2% of the surface area of the container. The wet gel were dried at a temperature of 60° C. After 13 days, 10 dry gels which did not fracture even at room temperature were obtained. Yield of dry gels: 100%. The bulk density of the dry gels was 0.67 g/cm$^3$.

The 10 dry gels were placed in a sintering oven and heated to 200° C. at a heating rate of 30° C. per hour, maintained at 200° C. for 5 hours, heated to 300° C. at a heating rate of 30° C. per hour and maintained at 300° C. for 5 hours in order to remove absorbed water. Then the gels were heated from 300° C. to 950° C. at a heating rate of 60° C. per hour and maintained at 950° C. for 2 hours in order to remove carbon and ammonium chloride and accelerate the dehydrating concentration reaction. Then, the gels were cooled to 800° C. and maintained at 800° C. for 30 minutes while a mixture of He and Cl$_2$ flowed through the oven at a ratio of 2 l/min a 0.2 l/min, respectively. The gels were heated to 900° C. at a heating rate of 60° C. per hour, maintained at 900° C. for 1 hour, heated to 1000° C. at a heating rate of 60° C. per hour and maintained at 1000° C. for 3 hours in order to remove hydroxide groups. While O$_2$ flowed through the oven at a rate of 1 l/min, the gels were heated to 1100° C. at a rate of 60° C. per hour and maintained at 1100° C. for 30 hours in order to remove chloride. Then, while He gas only flowed through the oven, the gels were heated to 1250° C. at a heating rate of 30° C. per hour and maintained at 1250° C. for 30 minutes in order to close the pores in the gel. The gels were heated further from 1250° C. to 1400° C. at a heating rate of 60° C. per hour and maintained at 1400° C. for 1 hour in order to make the gels non-porous. Ten cylindrical transparent silica glass articles were obtained without fractures. Yield of cylindrical transparent silica glass articles: 100%.

The dimensions of the cylindrical transparent silica glass articles were 23.2 mm outer diameter and 417.4 mm length. Yield of glass material: 100%.

Moreover, Ge in the glass was measured by IMA, XMA, ICP and the like and 3 mol% of Ge was detected in every part of the glass that was measured, which indicated that the yeild of Ge was almost 100% and that Ge was uniformly dispersed in the glass.

Furthermore, transmission loss of optical fiber having dimensions of 200 um outer diameter obtained by fiber-drawing the cylindrical transparent silica glass article was less than 4 dB/km when the wave length was 1.57 um, which indicated that the optical fiber had very low transferring loss.

As shown in this Example, by adding Ge into the acid hydrolyzed solution, high-quality doped silica glass was provided.

EXAMPLE 12

10 mol% Ge cylindrical doped silica glass articles

Cylindrical silica glass articles were formed in the same was as described in Example 11 using the starting materials shown in Table 1. (All of the materials were refined by distillation, filtration and the like.)

TABLE 1

| acid hydrolyzed solution | | silica particle dispersed solution | |
|---|---|---|---|
| silicon ethoxide | 493.2 g | silicon ethoxide | 785.3 g |
| ethanol | 211 ml | ethanol | 839 ml |
| 0.2 N hydrochloric acid | 64.0 g | water | 271.7 g |
| germanium tetraethoxide | 172.4 g | ethanol | 839 ml |
| 0.2 N hydrochloric acid | 106.8 g | 29% ammonia water | 51 ml |

Ten cylindrical doped silica glass articles have the same dimensions as those shown in Example 1 (23.2 mm diameter and 417.5 mm length) were obtained. Yield of doped silica glass articles: 100%.

The Ge content of the cylindrical doped silica glass articles was measured and 10 mol% of Ge was detected at every part of the silica glass articles that was measured. These measurements showed that the yield of Ge was almost 100% and that the Ge was uniformly dispersed in the glass articles.

Using a rod-in-tube method and a glass article of this Example having a clad tube of pure silica, an optical fiber of step-index type of 125 um outer diameter and 50 um core diameter was formed. The wavelength-transmission loss property of the optical fiber was measured and the absorption peak of hydroxide groups included therein was seen at wavelengths of 1.39 um and 1.41 um. At a wavelength of 1.56 um, the transferring loss was less than 1.0 dB/km, which meant that the optical fiber had a low transferring loss and was useful as a preform for a core. The hydroxide groups in the resulting glass were less than 100 ppb, as shown by the absorption peaks.

As described above, by adding Ge to the acid hydrolyzed solution, high-quality doped silica glass articles were obtained.

EXAMPLE 13

10 mol% Ge tubular doped silica glass articles

A sol solution having the same composition as in Example 12 was gelled by a rotating gelation method to a tubular wet gel. The tubular wet gel was dried and sintered as described in Example 12. However, the tubular wet gel of this Example could be dried more uniformly than the cylindrical gel of Example 12 and the drying step was completed within 5 days. Furthermore, foams and foreign particles of irregular shape which could have been included in the glass were completely eliminated even though a great deal of care was not taken in the casting process.

As can be seen, by adding Ge into the acid hydrolyzed solution, high-quality doped silica glass was obtained.

EXAMPLE 14

5 mol% of Ge doped silica glass articles

Four hundred forty-four and six-tenths g of 0.2 normal hydrochloric acid was added to 642.5 g of silicon ethoxide in order to hydrolyze the silicon ethoxide. The solution was referred to as the acid hydrolyzed solution.

A solution of 78 ml of 29% ammonia water, 839 ml of ethanol and 271.7 g of water was added to a solution of 785.3 g of silicon ethoxide and 839 ml of ethanol and the solution was stirred at 300° C. to yield fine particle silica. After maintaining the solution overnight, the solution was concentrated under reduced pressure. The alcohol in the concentrated solution was replaced by water in order to enhance the yield of dry gel in the drying step and the pH of the solution was adjusted to 4.0 by the addition of 2 normal hydrochloric acid in order to prevent gelation of the sol solution when the acid hydrolyzed solution was mixed with the silica particle dispersed solution. The solution, which included fine particle silica having a mean particle diameter of 0.28 um, was referred to as the silica particle dispersed solution.

The acid hydrolyzed solution and the silica particle dispersed solution were mixed to yield a sol solution and the pH of sol solution was adjusted to 4.75 by the addition of 0.2 normal ammonia water and water. The volume of the sol solution was adjusted to 1872 ml.

The sol solution was placed in a cylindrical container of Teflon (50 mm inner diameter and 1000 mm length) to a height of 900 mm and was gelled in 40 minutes without rotating the container at room temperature of about 20° C.

Ten wet gels formed in this manner were aged for 3 days and then placed into a drying container having openings amounting to 0.2% of the surface area of the container and the wet gels were dried at 60° C. In 13 days, the dry gels which did not fracture even at room temperature were obtained. Yield of dry gels: 100%. The bulk density of the dry gels was 0.67 g/cm$^3$.

The ten dry gels were placed in a sintering oven and heated to 200° C. at a heating rate of 30° C. per hour, maintained at 200° C. for 5 hours, heated to 300° C. at a heating rate of 30° C. per hour and maintained at 300° C. for 5 hours in order to remove absorbed water. Then the gels were heated from 300° C. to 920° C. at a heating rate of 60° C. per hour and maintained at 920° C. for 2 hours in order to remove carbon and ammonium chloride and to accelerate the dehydrating concentration reaction. The gels were cooled to room temperature in order to yield 10 sintered gels that had a great many micropores.

The sintered gels were dipped into a solution for germanium tetraethoxide and ethanol in order to impregnate the gels with the solution. After drying, the gels were sintered as described in Example 11 and cylindrical transparent doped silica glass articles were obtained.

The dimensions of the transparent glass articles were 23.5 mm outer diameter and 423.6 mm length. Ge in the glass was measured by IMA, XMA, ICP and the like and 5 mol% of Ge was detected at every part of the glass that was measured, indicating the Ge was uniformly dispersed in the glass.

As has been shown, by adding Ge into the dry gel, high-quality doped silica glass was obtained.

EXAMPLE 15

3 Mol% Ge doped cylindrical glass articles

Four hundred forty-four and six-tenths g of 0.02 normal hydrochloric acid was added to 642.5 g of silicon ethoxide in order to hydrolyze the silicon ethoxide. The solution was referred to as the acid hydrolyzed solution.

A silica particle dispersed solution was prepared as described in Example 11.

A solution of germanium tetrabutoxide and ethanol was hydrolyzed to yield a solution in which fine particle germanium having a mean particle diameter of less than 0.1 um was uniformly dispersed.

The acid hydroloyzed solution, the silica particle dispersed solution and the germanium particle dispersed solution were mixed at a molar ratio of silicon atoms:silicon atoms:germanium atoms of 45:52:3. The preparation of the sol solution, gelation, drying and sintering were all performed as described in Example 11 and cylindrical transparent doped silica glass articles were obtained.

The dimensions of the transparent glass articles were 23.2 mm outer diameter and 200 mm length. Ge in the glass was measured using IMA, XMA, ICP and the like and 3 mol% of Ge was detected in every part of the glass that was measured, indicating that the yield of Ge was almost 100% and that the Ge was uniformly dispersed in the glass.

By adding Ge in the form of fine particles, high-quality doped silica glass was obtained.

EXAMPLE 16

3 mol% Ge doped silica glass articles

Four hundred forty-four and six-tenths g of 0.02 normal hydrochloric acid was added to 642.5 g of silicon ethoxide in order to hydrolyze the silicon ethoxide. The solution was referred to as the acid hydrolyzed solution.

Fine particles of germania and silica were uniformly dispersed in water. The germania had a mean particle diameter of 0.15 um and was used in an amount of 6 mol% with respect to the silica. The silica was synthesized by a gas-phase method. Twice the molar weight of germania and silica was used with respect to the molar weight of water. A fine particle dispersed solution was obtained.

The hydrolyzed solution and the fine particle dispersed solution were uniformly mixed in such a way that the molar ratio of silicon to germanium in the completed glass was 97 to 3. Then the sol solution was gelled, dried and sintered as described in Example 11. A cylindrical transparent glass was obtained.

The dimensions of the transparent glass were 23.2 mm outer diameter and 200 mm length. The Ge included in the glass was measured by XMA, IMA, ICP and the like and 3 mol% of Ge was detected in every part of the glass that was measured, indicating that the yield of Ge was almost 100% and that the Ge was uniformly dispersed in the glass.

As can be seen, by adding Ge in the form of fine particles, high-quality doped silica glass was obtained.

EXAMPLE 17

3 mol% Ge doped silica glass articles

A solution of silane tetrachloride was hydrolyzed in n-hexane to yield a hydrolyzed solution.

Fine particles of germania and silica were uniformly dispersed in n-hexane and ethanol. The germania and silica had a mean particle diameter of 0.13 um and were used in an amount of 6 mol% with respect to the silica. The silica was synthesized by a gas-phase method. A fine particle dispersed solution was obtained.

The hydrolyzed solution and the fine particle dispersed solution were uniformly mixed in such a way that the molar ratio of silicon to germanium of the metal atom in the complete glass was 97 to 3. Then the sol solution was gelled, dried and sintered as described in Example 11 and a cylindrical transparent glass was obtained.

The dimensions of the transparent glass were 5 mm outer diameter and 200 mm length. The amount of Ge in the glass was measured by XMA, IMA, ICP and the like and 3 mol% of Ge was detected at every part of the glass that was measured, indicating that the yield of Ge was almost 100% and that the Ge was uniformly dispersed in the glass.

As can be seen, by adding Ge in the form of fine particles, high-quality doped silica glass was obtained.

EXAMPLE 18

Various doped silica glasses including different dopants were formed with changing the method of addition. The results are shown in Table 2.

highly refractive doped silica glass of the invention and coating with a low refractive material, such as plastic, an optical fiber is manufactured at low cost. Colored silica glass can also be obtained at low cost. Other applications of the silica glass articles of the present invention include preforms of the core of optical fibers, preforms of the clad of optical fibers, various optical glass articles, construction materials, and the like.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of preparing a doped silica glass article, comprising:
   hydrolyzing silicon alkoxide;
   adding ultrafine particle silica to the hydrolyzed solution to obtain a sol solution;
   adjusting the pH of the sol solution to a pre-determined value of less than about 7.0;
   placing the sol solution into a container;
   gelling the sol solution to a wet gel;
   drying the wet gel to a dry gel;

TABLE 2

| DOPANT | Added To Hydrolyzed Solution | In the Form of Fine Particle | Added to Gel | Added to Sol Solution | Added During Sintering | Note |
|---|---|---|---|---|---|---|
| Al | ◉ | ◉ *1 | — | — | — | 30% *5 |
| Ti | ○ | — | — | — | — | 15% *5 |
| Zr | ◉ | ◉ *1 | — | — | — | 10% *5 |
| Ta | ○ | — | — | — | — | 5% *5 |
| P | ○ | — | — | — | — | 10% *5 |
| B | ◉ | ◉ *1 | — | ◉ | — | 15% *5 |
| Ga | ○ | — | — | — | — | 20% *5 |
| Li | — | — | — | ○ | — | small amount *5 |
| Na | ○ | — | — | — | — | 20% *5 |
| K | — | — | — | ○ | — | small amount *5 |
| Cs | — | — | ○ | ○ | — | small amount *5 |
| Tl | — | — | — | ○ | — | small amount *5 |
| Ag | — | — | — | ○ | — | small amount *5 |
| F | — | ◉ *1 | — | — | ◉ *3 | Δ · 0.4% *5 |
| N | — | — | — | — | x *4 | fumed |
| (Ref.) | (Embo. 1, 2, 3) | (Embo. 5, 6, 7) | (Embo. 4) | — | — | >10% *5 |
| Ge | | ◉ *1 *2 | ◉ | | | acceptable |

◉ ... A large bulk glass was obtained.
○ ... A bulk glass was obtained.
x ... A bulk glass was not obtained.
— ... not examined.
*1 ... The dopant was added to fine particle silica.
*2 ... The mixture of fine particles of dopant and silica.
*3 ... SF₆ gas
*4 ... N₂ gas
*5 ... The amount of doping.

As can be seen, by adding various dopants and using various methods, various doped silica glasses were obtained.

As described herein, it is possible to produce high quality doped silica glass of industrially acceptable size according to the method of the present invention. For example, a pure cylindrical doped silica glass article of high quality which is useful as a fiber core of an optical fiber having an outer diameter of 2 cm and a length of 1 m is provided with good yield. By wire-drawing the sintering the dry gel to yield the doped silica glass article; and
including at least one dopant.

2. The method of claim 1, wherein the dopant is selected from the group consisting of metal alkoxide having the formula $M(OR)_x$ wherein M is a metal, R is an alkyl group having less than 20 carbon atoms and x is an integer equal to the valence of the metal, metal oxide having the formula $MO_y$ wherein M is a metal and y is an integer equal to one-half the valence of the metal, and pure metal.

3. The method of claim 2, wherein the dopant is metal alkoxide.

4. The method of claim 3, wherein the metal alkoxide is germanium tetraalkoxide.

5. The method of claim 1, wherein the dopant is doped in the form of metal oxide.

6. The method of claim 1, wherein the dopant is doped in gaseous form.

7. The method of claim 2, wherein the dopant is metal oxide in the form of fine particles.

8. The method of claim 1, wherein the container is a cylindrical container formed of a hydrophobic material.

9. A method of preparing a cylindrical doped silica glass article, comprising:
hydrolyzing silicon alkoxide;
adding ultrafine particle silica to the hydrolyzed solution to obtain a sol solution;
adjusting the pH of the sol solution to a pre-determined value of less than about 7.0;
placing the sol solution into a hydrophobic cylindrical container;
gelling the sol solution to a wet gel;
drying the wet gel to a dry gel;
sintering the dry gel to yield the doped silica glass article; and
including at least one metal alkoxide dopant having the formula $M(OR)_x$, wherein R is an alkyl group, M is a metal and x is an integer equal to the valence of the metal.

10. The method of claim 1 or 9, wherein the dopant is added to the hydrolyzed solution.

11. The method of claim 1 or 9, wherein the dopant is added to the sol solution.

12. The method of claim 1 or 9, wherein the dopant is added to the gel.

13. The method of claim 1 or 9 wherein the dopant is added to the glass during sintering.

14. The method of claim 1 or 9, wherein the dopant is added in the form of fine particles.

15. The method of claim 1 or 9, wherein the alkyl group in the metal alkoxide includes from 1 to 20 carbon atoms.

16. The method of claim 1 or 9, wherein the metal in the metal alkoxide is selected from the group consisting of Li, Na, K, Cs, B, Al, Ga, Ge, N, P, F, Zr, Ti, Ta, Tl, Tb and Ag.

17. The method of claim 9, wherein the metal alkoxide is germanium tetraalkoxide represented by the general formula $Ge(OR)_4$.

18. The method of claim 17, wherein the germanium tetra alkoxide is selected from the group consisting of germanium tetramethoxide, germanium tetraethoxide and germanium tetrapropoxide.

19. The method of claim 9, wherein the silicon alkoxide is silicon methoxide.

20. The method of claim 9, wherein the silicon alkoxide is silicon ethoxide.

21. The method of claim 9, wherein the metal alkoxide is germanium tetraethoxide represented by the general formula $Ge(OEt)_4$.

22. The method of claim 9, wherein the hydrolyzed solution is prepared by:
partially hydrolyzing silicon alkoxide with water at a molar ratio between about 1 and 3 with respect to the silicon alkoxide at a temperature less than about 20° C.;
adding an effective amount of metal alkoxide; and
hydrolyzing alkoxide groups remaining in the solution.

23. The method of claim 9, wherein the hydrolyzed solution is prepared by:
adding water to a solution of silicon alkoxide and alcohol at a volume ratio of more than about 20% with respect to the silicon alkoxide, the water being used in an amount of between about 1 and 3 moles with respect to the molar amount of silicon alkoxide;
adding an effective amount of metal alkoxide to the hydrolyzed silicon alkoxide solution; and
hydrolyzing alkoxide groups remaining in the solution.

24. The method of claim 9, wherein the ultrafine particle silica is ammosil prepared by hydrolyzing a silicon alkoxide with ammonia water or ammonia gas and water.

25. The method of claim 24, wherein the mean particle diameter of the ammosil is between about 0.01 and 1.0 um.

26. The method of claim 24, wherein the ammosil is uniformly dispersed in the ammosil containing sol solution by ultrasonic vibration, centrifugal separation, or both.

27. The method of claim 9, wherein the sol solution is prepared by adding a solution containing fine particle silica in the form of ammosil having a predetermined pH value to the sol solution in a predetermined ratio.

28. The method of claim 9, wherein the pH of the sol solution is adjusted to between about 3 and 6.

29. The method of claim 9, wherein the pH of the sol solution is adjusted by adding a base selected from the group consisting of ammonia, ammonia gas, an aqueous solution of ammonia, triethylamine, an aqueous solution of triethylamine, pyridine, an aqueous solution of pyridine, aniline and an aqueous solution of aniline.

30. The method of claim 9, wherein the temperature and the pH of the sol solution are adjusted so that gelation of the sol is complete in a period of between about 3 and 100 minutes.

31. The method of claim 9, wherein the composition of the sol solution is adjusted so that the volume of said transparent glass obtained by drying and sintering the wet gel is between about 5 and 15% of the volume of the wet gel.

32. The method of claim 9, wherein during drying of the wet gel, both ends of the cylindrical container are covered with lids, each lid having openings amounting to less than about 15% of the surface area of the lid.

33. The method of claim 9, wherein during drying of the wet gel, the wet gel is removed from the hydrophobic cylindrical container and placed into a second container having openings amounting to less than about 15% of the surface area of the second container.

34. The method of claim 9, wherein the wet gel is dried at a temperature between about 0° and 100° C. and heated to a temperature between about 20° and 120° C. at a heating rate less than about 120° C. per hour, at which temperature the gel is dried to a dry gel by contraction drying.

35. The method of claim 9, wherein the sintering step includes the steps of:
removing absorbed water by heating the gel to a first selected temperature;
removing carbon by heating the gel to a second selected temperature;

removing hydroxide groups by heating the gel to a third selected temperature;

removing hydrochloride or fluoride and making the gel nonporous by heating the gel to a fourth and then to a fifth selected temperature; and converting the gel by heating to a sixth selected temperature to a transparent glass.

36. The method of claim 35, wherein absorbed water is removed by at least one step of heating the gel to a first selected temperature between about 20° and 400° C. at a heating rate less than about 400° C. per hour and maintaining the gel at the first selected temperature for at least about one hour.

37. The method of claim 35, wherein carbon is removed by at least one step of heating the gel to a second selected temperature between about 400° and 1200° C. at a heating rate between about 30° and 400° C. per hour and maintaining the gel at the second selected temperature for at least about one hour.

38. The method of claim 35, wherein hydroxide group is removed by at least one step of heating the gel to a third selected temperature between about 700° and 1200° C. while a carrier gas selected from the group consisting of He, Ne, Ar, $N_2$, $O_2$ and a hydroxide group removing agent selected from the group of consisting of $Cl_2$, $SOCl$, $SF_6$, $CF_4$, $C_2F_6$ and $C_3F_8$ flow through the sintering oven at a flowing amount ratio between about 1 and 40% with respect to the carrier gas.

39. The method of claim 38, wherein after removing hydroxide groups, chloride or fluoride is removed by at least one step of flowing a carrier gas selected from the group consisting of He, Ne, Ar and $N_2$ and oxygen through the sintering oven at a flowing ratio between about 1 and 100% with respect to the carrier gas at a fourth selected temperature between about 700° and 1200° C. and the gel is made non-porous by heating the gel to a fifth selected temperature between about 1000° and 1500° C. while pure He only flows through the sintering oven.

40. The method of claim 39, wherein the gel is converted to a transparent glass by heating the gel to a sixth selected temperature between about 1000° and 1600° C. and maintaining the gel at the sixth selected temperature for a period of time to effect the conversion.

41. The method of claim 38, wherein the heating rate is between about 0.5° and 1000° C. per minute.

42. The method of claim 39, wherein the heating rate is between about 0.5° and 1000° C. per minute.

43. The method of claim 40, wherein the heating rate is between about 0.5° and 1000° C. per minute.

44. In a method of preparing a doped cylindrical silica glass article, by adding ultrafine particle silica into a hydrolyzed solution of silicon alkoxide, adjusting the pH of the sol solution to a value of less than about 7.0, gelling the sol solution to a wet gel, drying the wet gel to a dry gel, and sintering the dry gel to a silica glass, the improvement which comprises adding an effective amount of a metal alkoxide dopant having the general formula $M(OR)_x$, wherein M is the metal, R is an alkyl group and x is an integer representing the valence of the metal to the article to alter the refractive index of the glass to a desired value.

45. The method of claim 44, wherein the silicon alkoxide is silicon ethoxide and the dopant is germanium tetraethoxide.

* * * * *